United States Patent Office 2,881,164
Patented Apr. 7, 1959

2,881,164

RIBOFURANOSYL DERIVATIVES OF 6-ARALKYL-AMINO AND 6-HETEROCYCLICALKYLAMINO-PURINES

Henry Marcell Kissman, Nanuet, N.Y., and Martin Joseph Weiss, Teaneck, N.J., assignors to American Cyanamid Company, New York, N.Y., a corporation of Maine No Drawing. Application July 18, 1955
Serial No. 522,818

3 Claims. (Cl. 260—211.5)

This invention relates to ribofuranosyl derivatives of certain 6-amino substituted purines. More particularly the present invention is concerned with the preparation of compounds having the following general formula

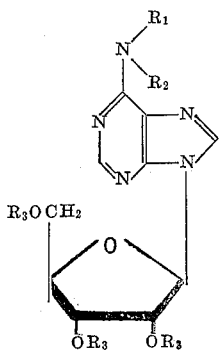

in which $R_1$ is a hydrogen atom, $R_2$ is a member of the group consisting of aralkyl and heterocyclicalkyl radicals, and $R_3$ is a member of the group consisting of hydrogen atoms, acetyl and benzoyl radicals.

The novel compounds of this invention are of value as plant vitamins; for example, they will stimulate the growth of carrot tissue.

The novel compounds may be prepared by condensing a chloromercury salt of 6-chloropurine with an acylated ribofuranosyl chloride preferably where the acyl group is an aroyl group such as benzoyl. The condensation is preferably carried out in the presence of an inert hydrocarbon solvent such as xylene or toluene at temperatures ranging from 80 to 150° C.

The acylated 6-chlororibofuranosylpurine is then reacted with an amine as hereinafter described in the presence of a hydroxylated solvent such as methyl Cellosolve, for example, and at temperatures of from 60 to 200° C. in a manner so as to replace the chloro group with either an aralkylamino or heterocyclicalkylamino radical.

Among the suitable amines which may be employed in the above described replacement reaction to produce the novel aralkylamino and heterocyclicalkylaminopurine ribosides of this invention there may be mentioned furfurylamine, benzylamine, thenylamine, 3-aminomethylenefuran, α-(2-furyl)ethylamine, 2-aminomethylenepyridine, p-methylbenzylamine, m-methylbenzylamine, o-methylbenzylamine, p-chlorobenzylamine, m-chlorobenzylamine, o-chlorobenzylamine, p-methoxybenzylamine, m-methoxybenzylamine, o-methoxybenzylamine, p-nitrobenzylamine, 2-aminomethylene-4-nitrofuran, 2-phenylethylamine, 1-phenylethylamine, etc.

The acylated aralkylamino or heterocyclicalkylamino ribofuranosylpurines may then be deacylated to produce the final desired products. Preferably the deacylation is carried out by treating the blocked ribofuranosylpurine with a metal alkoxide in the presence of an alcohol such as methanol, ethanol, etc. at temperatures of from 0° C. to 200° C.

The invention will be described in greater detail in conjunction with the following specific examples.

EXAMPLE 1

*6-chloro-9-(2',3',5'-tri-O-benzoyl-β-D-ribofuranosyl) purine*

A solution of 2,3,5-tri-O-benzoyl-D-ribofuranosyl chloride, obtainable from 1-O-acetyl-2,3,5-tri-O-benzoyl-β-D-ribofuranose with ethereal hydrogen chloride following the procedure of copending application of Kissman and Baker, Serial No. 517,368, filed June 22, 1955, in 20 ml. of dry xylene is added to an azeotropically dried suspension of 6.85 grams of mercuric chloride derivative of 6-chloropurine, which is deposited on 5 grams of diatomaceous earth, in 250 ml. of xylene. The mixture is stirred under reflux for three hours and is then filtered while hot. The precipitate is washed with chloroform and the combined filtrate and washings are evaporated under reduced pressure. The residue is dissolved in a mixture of 100 ml. of chloroform and 20 ml. of 30% aqueous potassium iodide solution. The layers are separated and the chloroform layer is washed with another 10 ml. portion of the potassium iodide solution and then with 15 ml. of water. The organic solution is dried over magnesium sulfate, filtered and evaporated under reduced pressure to afford 11.05 grams of amorphous 6-chloro-9-(2',3',5'-tri-O-benzoyl-β-D-ribofuranosyl)purine. This material is sufficiently pure for subsequent reactions. To obtain material of greater purity, 1 gram of this substance is chromatographed in benzene solution on a column of acid washed alumina. Elution with benzene: ethyl acetate (1:1) yields 0.68 gram of colorless analytically pure 6-chloro-9-(2',3',5'-tri-O-benzoyl-β-D-ribofuranosyl)purine as a fluffy glass. The substance is soluble in benzene, chloroform and ethyl acetate. The compound is not soluble in water or hexane.

$(\lambda_{max.}^{EtOH}=265\ m\mu,\ \epsilon\ 9,600);\ [\alpha]_D^{25}$ $= -64.0°$ (C., 798 in EtOH)

EXAMPLE 2

*6-furfurylamino-9-β-D-ribofuranosylpurine*

To a solution of 0.6 gram of chromatographed 6-chloro - 9 - (2',3',5' - tri - O - benzoyl-β-D-ribofuranosyl) purine in 15 ml. of methyl Cellosolve is added 1.5 ml. of freshly distilled furfurylamine. The solution is heated at the reflux point for one hour and then freed from solvent in vacuo. The residue is dissolved in 20 ml. of chloroform and the solution is extracted with 5 ml. of a saturated aqueous sodium bicarbonate solution and is then dried over magnesium sulfate. The filtered solution is evaporated under reduced pressure and dried in vacuo over phosphorous pentoxide for several hours and yields 0.69 gram of 6-furfurylamino-9-(2',3',5'-tri-O-benzoyl-β-D-ribofuranosyl)purine. The compound is soluble in methylene chloride, ethyl acetate and in ether. It is insoluble in water and in hexane. To a solution of 0.67 gram of 6-furfurylamino-9-(2',3',5-tri-O-benzoyl-β-D-ribofuranosyl)purine in 20 ml. of anhydrous methanol is added 0.2 ml. of a 1 N solution of sodium methoxide in methanol. The mixture is allowed to reflux for one hour and is then condensed in vacuo to a volume of 10 ml. when solid material begins to crystallize. The reaction mixture is cooled in ice and is then filtered to afford, after drying in vacuo, 0.269 gram of crystalline 6-furfurylamino-9-β-D-ribofuranosylpurine. After recrystallization from a small amount of methanol, the material melts at 148–150° C. The compound is soluble in methanol, isopropanol, ethyl acetate and acetonitrile. It is somewhat soluble in water and is insoluble in ether or hexane.

($\lambda_{max.}^{EtOH}$=268 m$\mu$, $\epsilon$ 19,000); $[\alpha]_D^{25}$= —63.5°(C., 1.134 in EtOH)

EXAMPLE 3

*6-benzylamino-9-β-D-ribofuranosylpurine*

To a solution of 1 gram of 6-chloro-9-(2′,3′,5′-tri-O-benzoyl-β-D-ribofuranosyl)purine in 15 ml. of methyl Cellosolve is added 1.1 ml. of redistilled benzylamine. The mixture is heated at the reflux point for one hour and then evaporated under reduced pressure. The residue is partially dissolved in 70 ml. of chloroform and the mixture is washed with 10 ml. portions of 0.2 N hydrochloric acid, water and saturated sodium bicarbonate solution. The chloroform solution is dried over magnesium sulfate, filtered and evaporated under reduced pressure to produce 1.4 grams of impure 6-benzylamino-9-(2′,3′,5′-tri-O-benzoyl-β-D-ribofuranosyl)purine. The substance is soluble in methylene chloride, ethyl acetate and acetonitrile. It is not soluble in water or hexane. To a solution of 6-benzylamino-9-(2′,3′,5′-tri-O-benzoyl-β-D-ribofuranosyl)purine (1.3 grams) in 20 ml. of absolute methanol is added 0.2 ml. of a 1 N solution of sodium methoxide in methanol and the mixture is allowed to reflux for one hour. The solvent is removed in vacuo and the discolored residue is dissolved in a mixture of water and ether. The layers are separated and the aqueous layer extracted with several more portions of ether and then filtered through a layer of diatomaceous earth. The light yellow filtrate is evaporated in vacuo to afford 0.29 gram of crystalline 6-benzylamino-9-β-D-ribofuranosylpurine. After recrystallization from ethanol, the substance melts at 177–179° C. The compound is soluble in water, methanol, isopropanol and very sparingly in ethyl acetate. It is insoluble in ether or hexane.

($\lambda_{max.}^{EtOH}$=268 m$\mu$ ($\epsilon$, 20850), $[\alpha]_D^{25}$

= —68.6° (C., 0.554 in EtOH)

We claim:
1. Ribofuranosylpurine compounds having the general formula:

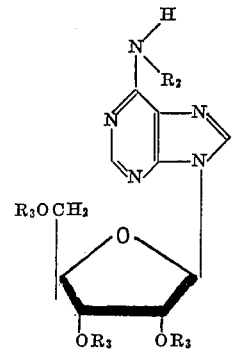

wherein $R_2$ is a member of the group consisting of phenyl-lower-alkyl and mononuclear heterocyclicalkyl radicals containing only one hetero atom, and $R_3$ is a member of the group consisting of hydrogen atoms, acetyl and benzoyl radicals.

2. 6-furfurylamino-9-β-D-ribofuranosylpurine.
3. 6-benzylamino-9-β-D-ribofuranosylpurine.

References Cited in the file of this patent
UNITED STATES PATENTS 2,719,843    Davoll et al. _____ Oct. 4, 1955

OTHER REFERENCES

Chem. Abst., v. 42, pp. 4142–2, 1948.
Davoll: J.A.C.S., v. 73, pp. 1650–51, 1951.
Davoll: J.A.C.S., v. 74, pp. 1563–6, 1952.
Chem. Abst., v. 46, p. 6597, 1952.
Elion et al.: J.A.C.S., v. 74, pp. 411–2, January 1952.